(12) United States Patent
Galambos et al.

(10) Patent No.: US 7,738,013 B2
(45) Date of Patent: Jun. 15, 2010

(54) SYSTEMS AND METHODS FOR POWER CONSERVATION IN A CMOS IMAGER

(75) Inventors: Tiberiu Galambos, Biniamina (IL); Miriam Fraenkel, Haifa (IL); Ben Furman, Haifa (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1258 days.

(21) Appl. No.: 10/819,897

(22) Filed: Apr. 6, 2004

(65) Prior Publication Data

US 2004/0233324 A1    Nov. 25, 2004

Related U.S. Application Data

(63) Continuation-in-part of application No. 10/474,275, filed as application No. PCT/US02/17358 on May 29, 2002, now Pat. No. 7,420,602.

(60) Provisional application No. 60/498,727, filed on Aug. 28, 2003, provisional application No. 60/294,388, filed on May 29, 2001.

(51) Int. Cl.
  *H04N 5/228* (2006.01)
  *H04N 5/217* (2006.01)
  *H04N 5/235* (2006.01)
  *H04N 5/335* (2006.01)

(52) U.S. Cl. .................. 348/222.1; 348/241; 348/229.1; 348/273; 348/308

(58) Field of Classification Search .............. 348/222.1, 348/308, 273, 241, 243, 229.1
See application file for complete search history.

(56) References Cited

U.S. PATENT DOCUMENTS

| 3,919,468 A | 11/1975 | Weimer |
| 4,471,228 A | 9/1984 | Nishizawa et al. |
| 4,774,588 A | 9/1988 | Noda et al. |
| 5,038,205 A | 8/1991 | Kondo et al. |
| 5,262,871 A | 11/1993 | Wilder et al. |
| 5,285,286 A * | 2/1994 | Kannegundla ............... 348/187 |
| 5,461,425 A | 10/1995 | Fowler et al. |
| 5,501,518 A | 3/1996 | Woodward |
| 5,541,654 A | 7/1996 | Roberts |
| 5,572,074 A | 11/1996 | Standley |

(Continued)

FOREIGN PATENT DOCUMENTS

WO    WO 98/15116    4/1998

OTHER PUBLICATIONS

Hsieh, Jeff Y. F. et al., "Low-Power MPEG2 Encoder Architecture For Digital CMOS Camera," IEEE, pp. IV-301-304, 1998.

(Continued)

*Primary Examiner*—Nhan T Tran
(74) *Attorney, Agent, or Firm*—Harness, Dickey & Pierce, P.L.C.

(57) ABSTRACT

The present invention provides systems and methods capable of reducing power consumption in an imaging device. One imaging device includes two analog to digital converters that are separately programmable and can be in different power modes. Each analog to digital converter is capable of creating an image derived from a pixel array that has a full field of view, but lower resolution.

20 Claims, 5 Drawing Sheets

U.S. PATENT DOCUMENTS

| | | | |
|---|---|---|---|
| 5,626,871 A | 5/1997 | Makino et al. | |
| 5,694,495 A | 12/1997 | Hara et al. | |
| 5,742,659 A | 4/1998 | Atac et al. | |
| 5,841,126 A | 11/1998 | Fossum et al. | |
| 5,898,168 A | 4/1999 | Gowda et al. | |
| 5,920,274 A * | 7/1999 | Gowda et al. | 341/155 |
| 5,949,483 A | 9/1999 | Fossum et al. | |
| 5,962,844 A | 10/1999 | Merrill et al. | |
| 5,965,871 A | 10/1999 | Zhou et al. | |
| 6,069,377 A | 5/2000 | Prentice et al. | |
| 6,118,482 A | 9/2000 | Clark et al. | |
| 6,166,367 A | 12/2000 | Cho | |
| 6,175,383 B1 | 1/2001 | Yadid-Pecht et al. | |
| 6,188,057 B1 | 2/2001 | Misek | |
| 6,295,085 B1 | 9/2001 | Munson et al. | |
| 6,366,312 B1 | 4/2002 | Crittenden | |
| 6,369,737 B1 | 4/2002 | Yang et al. | |
| 6,380,880 B1 * | 4/2002 | Bidermann | 341/155 |
| 6,466,265 B1 * | 10/2002 | Lee et al. | 348/308 |
| 6,476,864 B1 | 11/2002 | Borg et al. | |
| 6,482,192 B2 | 11/2002 | Haarer et al. | |
| 6,489,798 B1 | 12/2002 | Scott-Thomas et al. | |
| 6,512,858 B2 | 1/2003 | Lyon et al. | |
| 6,515,271 B1 | 2/2003 | Shimizu | |
| 6,633,335 B1 | 10/2003 | Hwang et al. | |
| 6,661,457 B1 * | 12/2003 | Mathur et al. | 348/273 |
| 6,665,013 B1 | 12/2003 | Fossum et al. | |
| 6,710,818 B1 | 3/2004 | Kasahara et al. | |
| 6,711,307 B1 | 3/2004 | Hsieh | |
| 6,838,651 B1 | 1/2005 | Mann | |
| 6,842,192 B1 | 1/2005 | Suzuki et al. | |
| 6,931,083 B1 | 8/2005 | Linder et al. | |
| 6,977,685 B1 | 12/2005 | Acosta-Serafini et al. | |
| 6,992,706 B2 * | 1/2006 | Mabuchi et al. | 348/273 |
| 7,102,674 B2 | 9/2006 | Takahashi | |
| 2001/0055482 A1 | 12/2001 | Braun et al. | |
| 2002/0044211 A1 | 4/2002 | Tujii et al. | |
| 2002/0101528 A1 | 8/2002 | Lee et al. | |
| 2003/0034434 A1 | 2/2003 | Simony | |
| 2003/0043089 A1 * | 3/2003 | Hanson et al. | 345/55 |
| 2003/0160883 A1 | 8/2003 | Ariel et al. | |
| 2004/0135910 A1 * | 7/2004 | Nam | 348/308 |

OTHER PUBLICATIONS

Panicacci, Roger et al., "Programmable Multiresolution CMOS Active Pixel Sensor," SPIE, vol. 2654, pp. 72-79.

Scheffer, Danny et al., "Random Addressable 2048 x 2048 Active Pixel Image Sensor," IEEE Transactions On Electron Devices, vol. 44, No. 10, pp. 1716-1720, Oct. 1997.

* cited by examiner

SYSTEMS AND METHODS FOR POWER CONSERVATION IN A CMOS IMAGER

CROSS-REFERENCES TO RELATED APPLICATIONS

The present application claims the benefit of U.S. provisional patent application 60/498,727 filed on Aug. 28, 2003, and is a continuation-in-part of U.S. patent application Ser. No. 10/474,275 filed on Oct. 8, 2003, which in turn claims priority to PCT application No. PCT/US02/17358 filed on May 29, 2002, which in turn claims priority to U.S. provisional patent application 60/294,338 filed on May 29, 2001. The entirety of each of the aforementioned patent applications are incorporated herein by reference for all purposes.

BACKGROUND OF THE INVENTION

The present invention is related to systems and methods for capturing, processing, displaying, and/or transmitting images. In particular, the present invention is related to the capture, processing, displaying, and/or transmission of images in a mobile environment, where power conservation is of high importance Charged coupled devices and CMOS pixel arrays have been used to detect images. The detected image information is acquired from the pixel array in the form of an analog electrical signal, and is then converted from an analog electrical signal to a digital electrical signal using an analog to digital converter. Such implementations include reading each of the pixels from the pixel array, and digitally processing the pixels after conversion to digital signals.

In some cases a single image sensor device is used in a multitude of configurations and, in particular, in a multiple of image resolutions. In those cases, the resolution of the pixel array fits with the highest needed resolution. For lower resolution, the image read from the sensor is electrically manipulated for lower resolution. The power consumption of the device, however, remains constant regardless of the configuration. In this way, the lower resolution configurations consume the same amount of power which is consumed for the highest resolution configurations.

In some cases, two analog to digital converters are utilized to read the various pixels, for example, one converting the odd-numbered pixels and the other converting the even numbered pixels. Use of two converters doubles the power consumption needed for the two analog to digital converters. Even when working with reduced resolution images, the two analog to digital converters consume power, because giving up the odd or the even numbered pixels would result in lost color information.

The analog circuits as well as the digital circuits remain in operation even when a limited Field Of View (FOV) cropped picture is output. Powering these unused analog circuits results in unnecessarily high power consumption. For at least the aforementioned reasons, there exists a need in the art for improved image processing systems.

BRIEF SUMMARY OF THE INVENTION

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the nature and advantages of the present invention may be realized by reference to the figures which are described in remaining portions of this disclosure. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
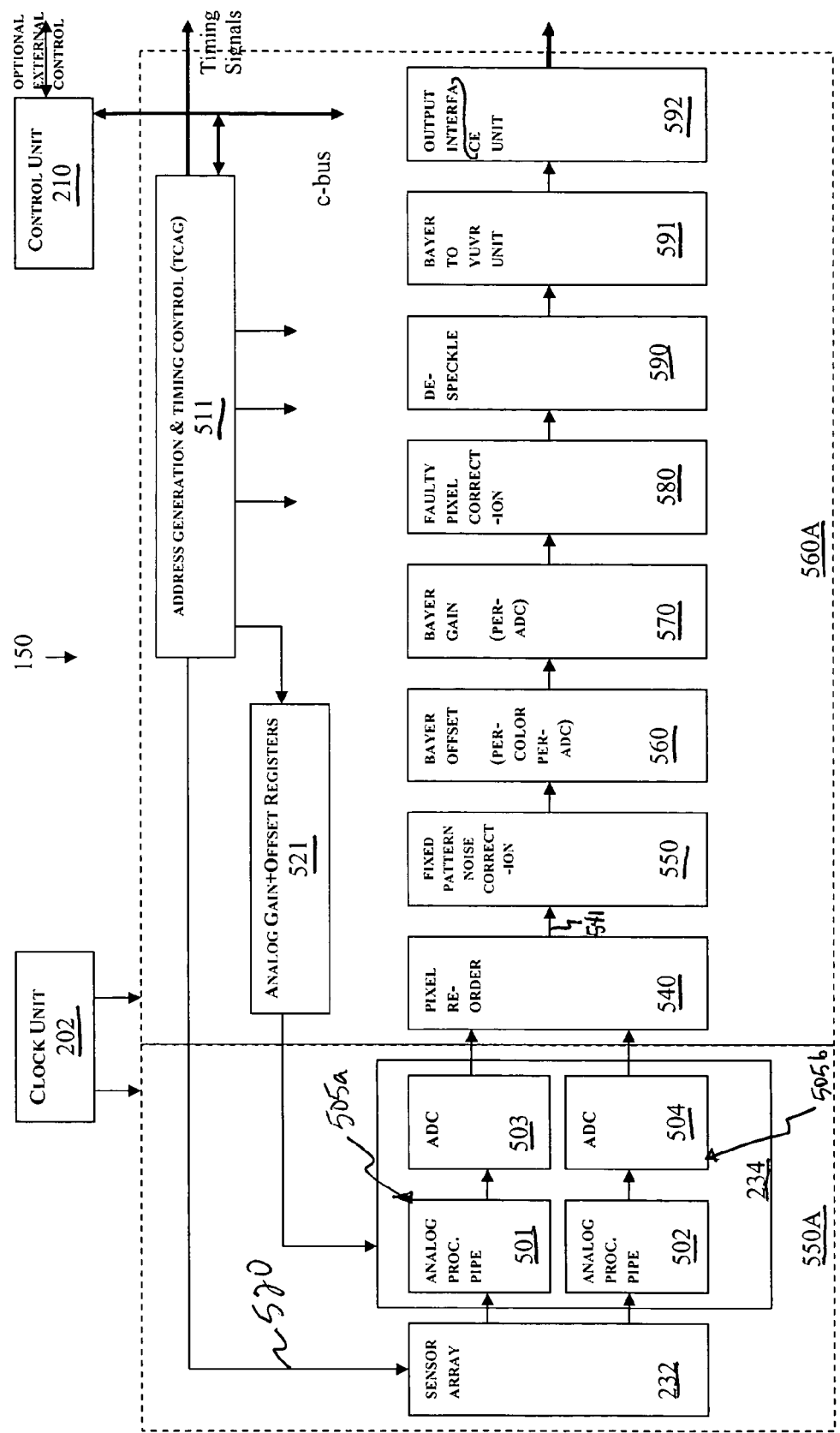
FIG. 1 is a block diagram of an imaging array followed by digital processing in accordance with an embodiment of the present invention.

The present invention provides systems and methods for reducing power consumption in an imaging device. Such systems and methods can be particularly applicable to mobile imaging solutions where low power consumption is a priority, however, one of ordinary skill in the art will recognize a number of other applications to which the systems and methods of the present invention can be applied.

In some of the embodiments, two analog to digital converters are used to read and process pixel information from a pixel array. These analog to digital converters are coupled to analog processing pipes in a way that significant power savings can be achieved in a reduced-resolution configuration, by deactivating one of the analog to digital converters, but at the same time retaining the capability of generating a full color image. In one particular case, a power reduction of approximately seventy-five percent can be achieved for a quarter-resolution picture, for example, using systems and methods in accordance with the present invention.

More generally, some embodiments of the present invention provide imaging systems that include a pixel array composed of a number of pixels grouped into a first pixel block and a second pixel block. The first pixel block represents a first portion of an image, while the second pixel block represents a second portion of the image. Analog electrical signals representing the respective portions of the image are generated from both the first pixel block and the second pixel block. The systems further include two analog to digital converters with one of the analog to digital converters being responsible for processing the analog electrical signals from the first pixel block, and the other analog to digital converter being responsible for processing analog electrical signals from the second pixel block. These analog to digital converters convert the analog electrical signals to digital electrical signals representing the respective portions of the image.

Further, in some embodiments, the analog to digital converters are separately programmable. Thus, for example, one of the analog to digital converters can be maintained in an active mode, while the other is maintained in an inactive mode, where power consumption is negligible. Yet further, some embodiments of the present invention provide two analog processing pipes—one corresponding to each of the analog to digital converters. Each of these analog processing pipes can also be individually programmed apart from the other. In particular, one of the analog processing pipes can be programmed to be active mode while the other can be programmed to be in an inactive mode, where, again, power consumption is negligible. A circuit in the standby mode, for example, consumes no more than 60% of the power consumed in the active mode, but this percentage could be much less. In one embodiment, the standby mode power consumption is about 50% of the active mode power consumption.

Further, in some embodiments, any or both of the analog to digital converters can be programmed to be in a standby mode, where power consumption is significantly less than power consumption than in an active mode but higher than that in an inactive mode, and where a fast transition to the active mode is provided. Further, in some embodiments of the present invention the analog processing pipes can also be programmed to be in a similar standby mode, again with significantly less than power consumption than in the active mode but higher than that in the inactive mode, and where fast transition to the active mode is provided.

In some cases, the previously described embodiments further include a programmable control network operable to place the first analog to digital converter in the active mode, and the second analog to digital converter in the inactive mode. Thus, using one or more software commands, one or the other of the analog to digital converters can be placed in an inactive mode, while the other is placed in an operational mode.

In various cases, the previously described embodiments further include a digital processing system that is capable of receiving one or both of the groups of digital electrical signals, and processing those digital electrical signals to form a digital image. For a full resolution configuration, the digital circuit processes pixels at full digital bandwidth, which is equal to the pixel rate. In the reduced resolution configurations, where one of the digital to analog converters is in inactive mode, the clock rate for the digital processing circuit is reduced commensurate to the reduced resolution. Significant amounts of power can be saved where the clocks are matched in reduced resolution configurations, and otherwise non-existent pixels are not processed in the digital processing circuitry.

In one particular case where one of the analog to digital converters is inactive, the digital image produced is approximately one-quarter the size of an image processed with both analog to digital converters active. This is achieved using one-half sub-sampling in both the vertical and horizontal directions.

Embodiments of the present invention provide methods for image acquisition where a CMOS imaging device is used that includes a pixel array and two analog to digital converters. The pixel array includes a first pixel block and a second pixel block, wherein the first pixel block provides a first group of analog electrical signals associated with a first portion of an image, and wherein the second pixel block provides a second group of analog electrical signals associated with a second portion of the image. One of the analog to digital converters converts the first group of one or more analog electrical signals to a first group of digital electrical signals. The other of the analog to digital converters converts the second group of one or more analog electrical signals to a second group of digital electrical signals. Each of the first and second analog to digital converters are separately programmable. In one particular case, the first group of digital electrical signals forms a full color portion of the detected image and the second group of digital electrical signals forms a second full color portion of the detected image. Thus, a full color image can be derived from information processed by one of the analog to digital converters, without requiring information from the other of the analog to digital converters.

In some cases, the methods further include programming the second analog to digital converter to be in inactive mode, with minimal or no power consumption. Such methods can further include operating the CMOS imaging device with one of the analog to digital converters in active mode, while the other analog to digital converter is in inactive mode.

In some embodiments, power saving is obtained when the imager is configured to output a limited FOV cropped window (hereinafter referred to as L-FOV). When areas of the imager array outside the defined window are output, the imager array is not scanned, and the analog processing and analog to digital converter or converters are in the standby mode, conserving a significant amount of power, yet providing fast transition to the active mode, when scanning of active window portions resume. Furthermore, in some embodiments and according to some methods, digital processing may also be turned off.

Some embodiments of the present invention provide imaging systems that include a pixel array composed of a number of pixels grouped into a first pixel block and a second pixel block. The first pixel block represents a first portion of an image, while the second pixel block represents a second portion of the image. Analog electrical signals representing portions of the image are generated from both the first pixel block and the second pixel block. The systems further include two analog to digital converters with one of the analog to digital converters being responsible for processing the analog electrical signals from the first pixel block, and the other analog to digital converter being responsible for processing analog electrical signals from the second pixel block. These analog to digital converters convert the analog electrical signals to digital electrical signals corresponding to the image.

Further, in some embodiments, the analog to digital converters are separately programmable. Thus, for example, one of the analog to digital converters can be maintained in an active mode, where power consumption is negligible, while the other is maintained in an inactive mode. Yet further, some embodiments of the present invention provide two analog processing pipes—one corresponding to each of the analog to digital converters. Each of these analog processing pipes can also be individually programmed apart from the other.

Turning to FIG. 1, an embodiment of imaging device 150 in accordance with some embodiments of the present invention is illustrated. This embodiment of imaging device 150 includes an analog domain 550A and a digital domain 560A. Analog domain 550A includes sensor array 232, coupled to a dual stream analog to digital converter system 234. There are two analog processing paths 505 through the dual stream analog to digital converter system 234. Analog to digital converter system 234 includes two analog processing pipes 501, 502. Each of the analog processing pipes 501, 502 is electrically coupled to a respective ten-bit Analog to Digital Converter (ADC) 503, 504. The first analog processing path 505a passes through the first analog processing pipe 501 and the first ADC 503, and the second analog processing path 505b passes through the second analog processing pipe 502 and the second ADC 504. Other embodiments could have more than two analog processing paths 505, e.g., four, eight, twelve, etc.

The digital domain 560A includes a pixel reordering unit 540, a fixed pattern noise correction unit 550, a Bayer offset unit 560, a Bayer gain unit 570, a faulty pixel correction unit 580, a de-speckle unit 590, a Bayer to YUV unit 591, and an output interface unit 592. The digital domain 560A also includes Timing Control & Address Generation (TCAG) unit 511 and analog gain+offset registers unit 521. Additional elements of imager 150 include a clock unit 202 and a control unit 210. Optionally, the control unit 210 can connect to an external processor. The units of digital domain 560A, as well as control unit 210 are described to detail in PCT application No. PCT/US02/17358 entitled "CMOS Imager for Cellular Applications", and filed May 29, 2002 by Fraenkel et al, which was previously incorporated herein by reference.

Clock unit 202 provides various clocks for distribution within imaging device 150. For power management purposes, one or more of the distributed clocks can be stopped. Where the imaging device is implemented in CMOS technology, this clock stopping results in a significant reduction in power by the circuitry that would have otherwise been operating based on the clock. Additional information related to clock unit 202 can be obtained from U.S. patent application Ser. No. 10/474,798 filed on Oct. 8, 2003, previously incorporated herein by reference for all purposes.

The analog domain 550A receives its sequence signals from the TCAG unit 511. The sequence signals connect to the sensor array 232 and to dual-stream analog to digital conversion system 234 for integration (e.g., exposure control) and read and reset operations. The sensor array 232 includes, among other things, a pixel array. In some embodiments, the pixel array can consist of CMOS transistors formed into a plurality of pixels. One such pixel array is described in U.S. patent application Ser. No. 10/485,707 filed on Feb. 2, 2004 and entitled "A Pixel Sensor with Charge Evacuation Element and Systems and Methods For Using Such," which is incorporated herein by reference for all purposes.

The sensor array 232 receives timing control signals 520 from TCAG 511 responsible for controlling the timing of sensor array 232. In addition, TCAG 511 connects to of the analog gain+offset registers 521 that can be programmed with analog gain and offset registers used in relation to analog processing pipes 501, 502. Output from these registers is used to control black offset, level shift, and a two stage gain in analog processing pipes 501, 502, as further described in relation to FIG. 2 below.

The analog electrical outputs from analog pipes 501, 502 are provided to analog to digital converters 503, 504, where the signals are converted to digital electrical signals. In particular embodiments of the present invention, analog to digital conversion system 234 comprises two ten bit analog to digital converters. The digital outputs from digital conversion system 234 are provided to digital domain 560A, where the image is processed digitally, as explained above.

Figure 2:
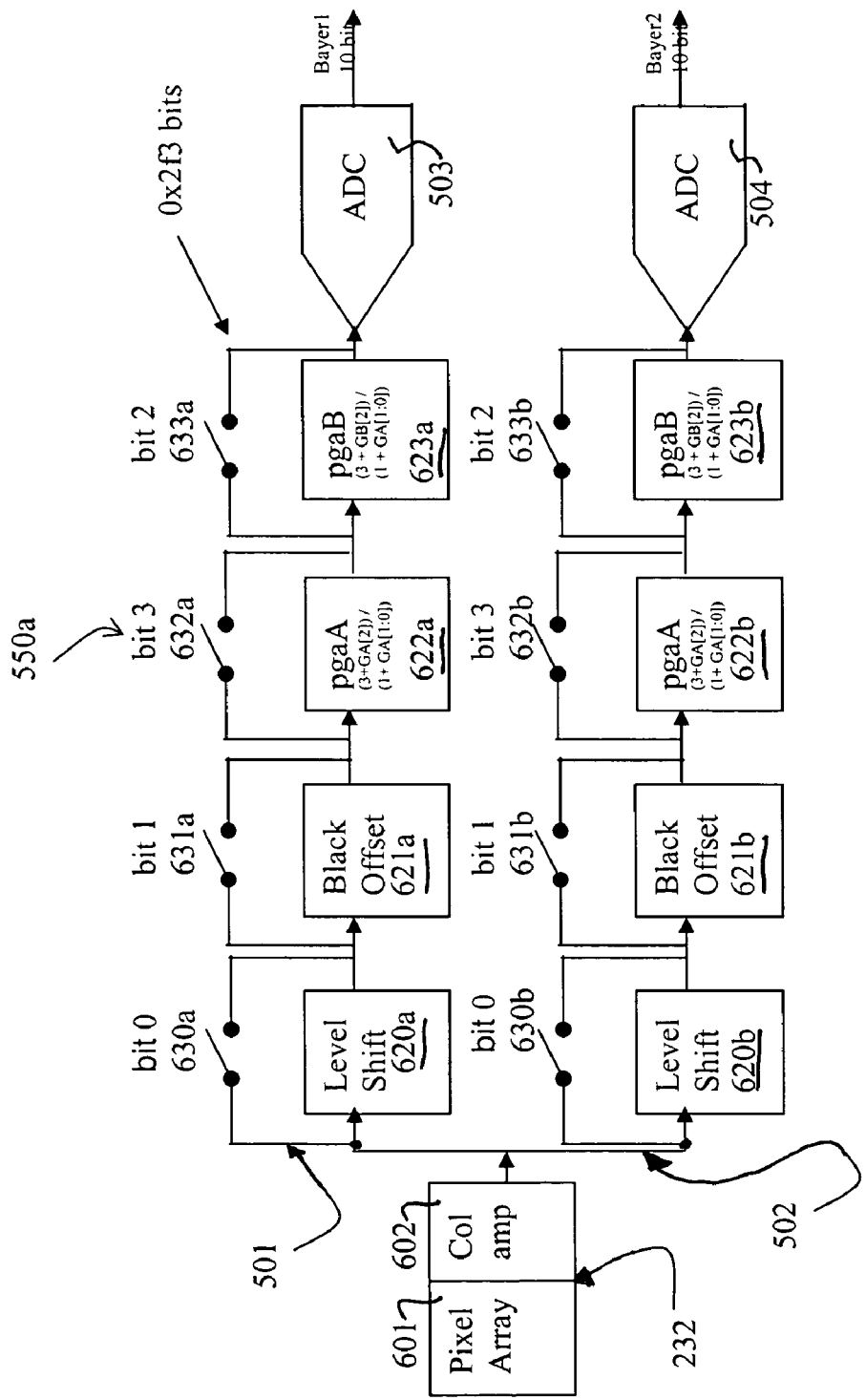
FIG. 2 is a block diagram of the analog processing pipes of the imaging array in accordance with some embodiments of the present invention.

FIG. 2 provides additional detail of analog domain 550A. The analog domain includes a sensor array 232 that comprises a pixel array 601 and column amplifiers 602. The outputs of column amplifiers 602 feed analog processing pipes 501, 502. Each of analog processing pipes 501, 502 include a series of processing stages 620, 621, 622, 623. Each of the processing stages 620, 621, 622, 623 can be selected via the analog gain+offset registers unit 521 by setting one or more of programmable bypass bits 630, 631, 632, 633. Thus, for example, where bypass bit 630a is set, a level shift is performed by the level shift function 620a as part of analog processing pipe 501. Similarly, where bit 631a, bit 632a, and/or bit 633a are set, a black offset function 621a, a first gain function 622a, and/or second gain 623a respectively are operational on data processed through the first analog processing pipe 501. Similarly, where bit 630b, bit 631b, bit 632b, and/or bit 633b are set, the level shift function 620b, the black offset function 621b, the first gain function 622b, and/or the second gain function 623b respectively are operational on data passed through the second analog processing pipe 502. Normally, the bypass bits 630, 631, 632, 633 are only manipulated in test modes, but some embodiments may allow manipulation during normal operation. Some embodiments may not even include the ability to bypass processing stages 620, 621, 622, 623.

Additional information about the pixel array 601, the column amplifiers 602, the level shift function 620, the black offset function 621, the first gain function 622, and the second gain function 623 is provided in U.S. patent application Ser. No. 10/474,798 filed on Oct. 8, 2003, previously incorporated herein by reference for all purposes. As illustrated in FIG. 1 and FIG. 2, two ten bit analog to digital converters 503, 504 are utilized.

Figure 3A:
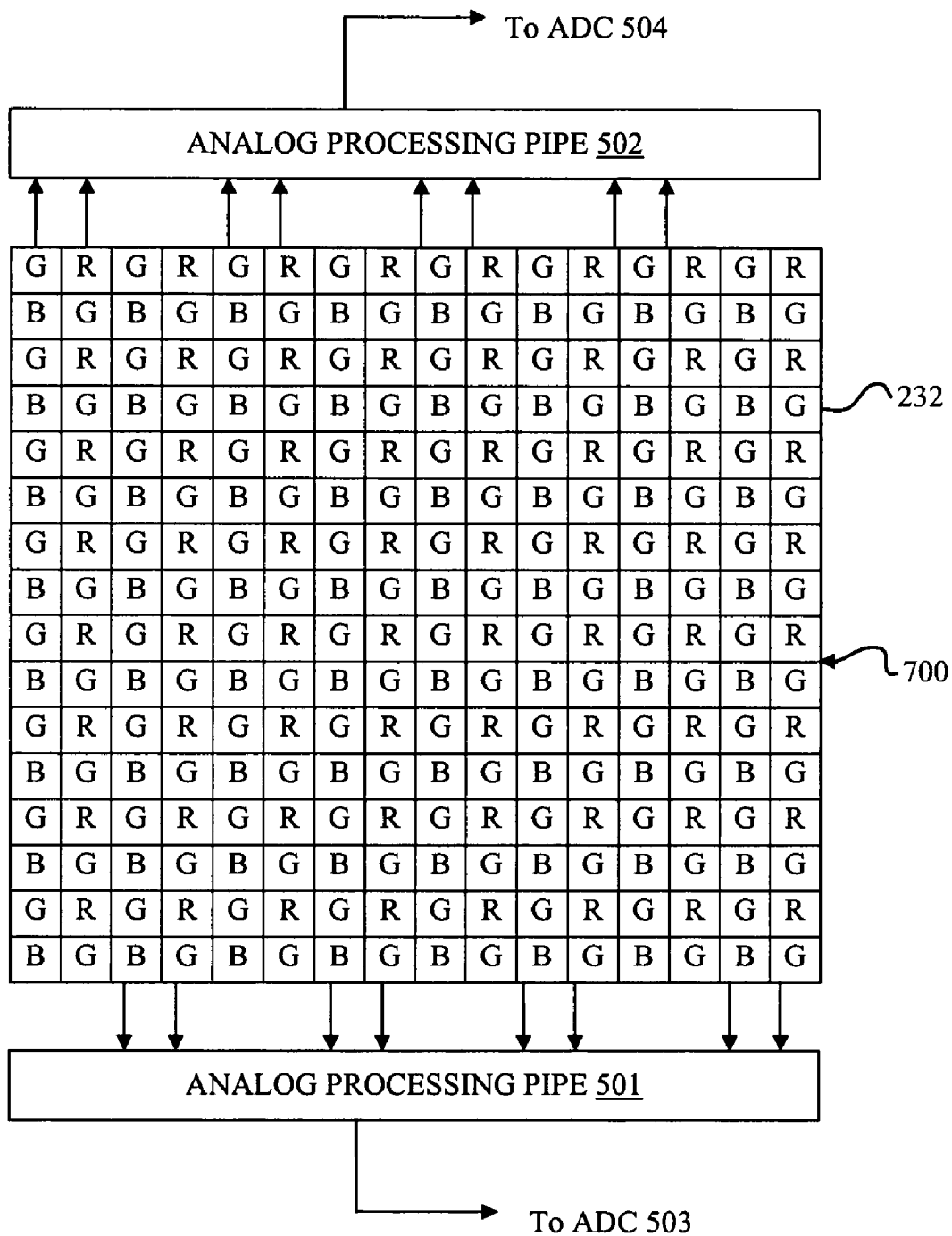
FIGS. 3a and 3b are logical diagrams illustrating the connectivity of a pixel array to a dual pipe analog processing system in accordance with some embodiments of the present invention.
Figure 3B:
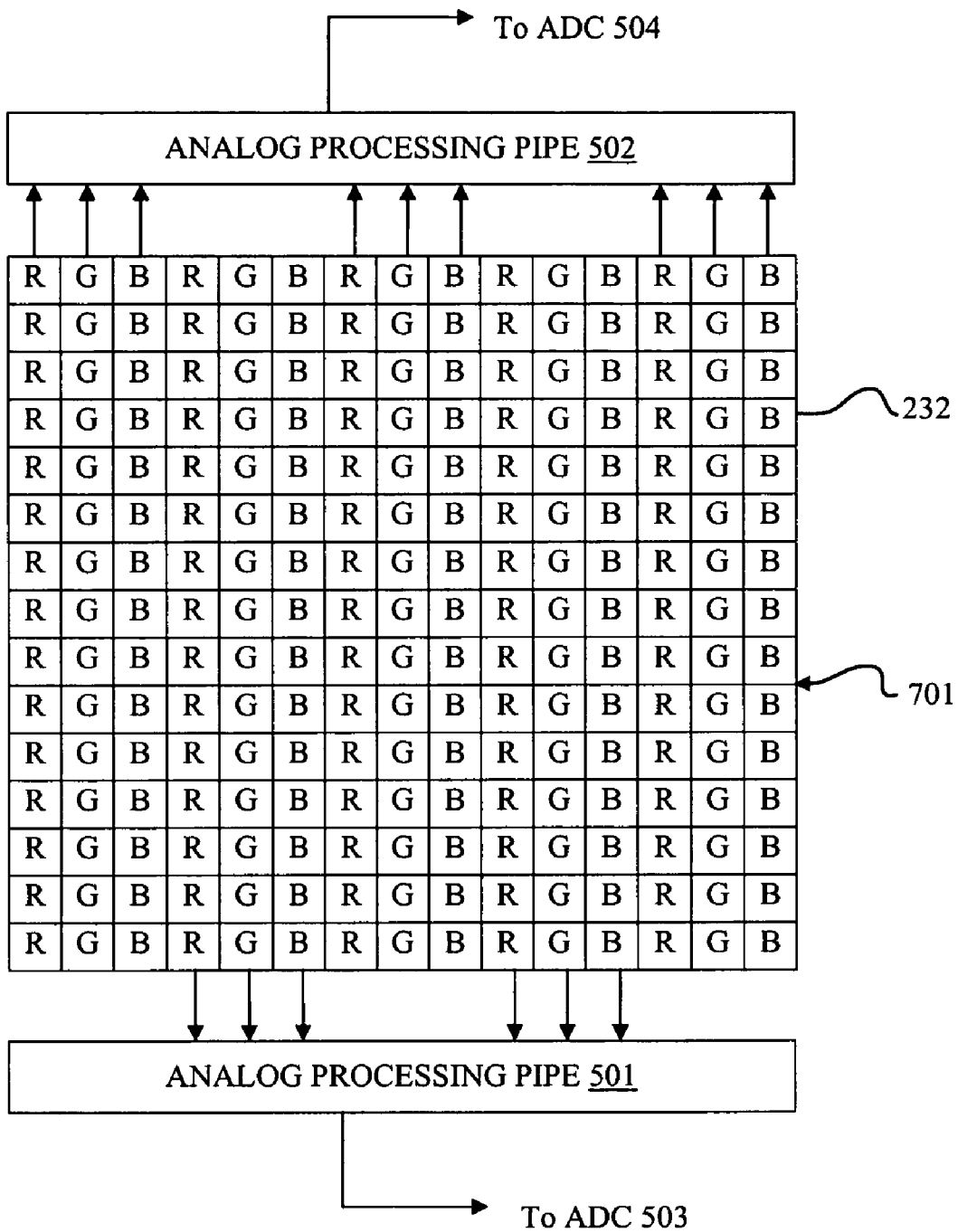

The distribution of the array columns between the two analog to digital converters is described in relation to FIGS. 3a and 3b. Turning to FIG. 3a, a representation 700 of columns and rows of pixel array 601 is depicted in relation to analog processing pipes 501, 502, and the respective analog to digital converters 503, 504. Pixel array 601 is covered with a color filter that includes two green pixels diagonal from one another, and one red and one blue pixel placed at either corner of a four pixel group. These different color components are represented in FIGS. 3a and 3b with a G for green, an R for red, and a B for blue.

As represented by the arrows extending from pixel array 601 to either of analog processing pipes 501, 502, the columns of pixel array 601 are divided into groups of four columns each. The first analog processing pipe 501 receives pixels from the two rightmost columns in each group of four columns, while the second analog processing pipe 502 receives pixels from the two leftmost columns in each group. By grouping the columns this way, each analog processing pipe 501, 502 receives pixels representing the full complement of red, green, and blue color components. Thus, where one or the other of analog processing pipes 501, 502 and the corresponding analog to digital converter 503, 504 are put in the inactive mode, a color image can still be obtained from the one in the active mode, albeit at a lower resolution.

FIG. 3b illustrates another representation 701 of the columns and rows of pixel array 601 that can be used in accordance with other embodiments of the present invention. In this representation 701, pixel array 601 is covered with a color filter that includes successive repeating columns of red, green and blue color components. The pixel columns are arranged in groups of six, with the first set of red, green, and blue pixels being sent to the second analog processing pipe 502, and the second set of red, green, and blue pixels being sent to the first analog processing pipe 501. Thus, when one or the other of analog processing pipes 501, 502 is put in the inactive mode, a full color image can still be derived from the pixels processed by the analog processing pipe 502, 501 in the active mode. Based on the disclosure provided herein, one of ordinary skill in the art will appreciate other groupings of pixels and processing thereof that is capable of creating a color image even where one of the analog to digital converters 503, 504 is not operational.

In some embodiments of imaging device 150, there are three main operational modes of analog domain 550A in relation to digital domain 560A. In the first mode (mode A), both analog processing pipes 501, 502, and both analog to digital converters 503, 504 are operational in the active mode.

Mode A produces a full resolution image. In mode A, two pixels are acquired, processed and converted by each analog processing pipe 501, 502 for every eight clock cycles. Thus, for every eight clock cycles, four pixels of pixel array 601 are acquired, processed, and converted using the two analog processing pipes 501, 502. As the next four pixels are acquired from pixel array 601, the previously converted pixels are output to digital domain 560*a* where they are reordered in a reordering unit 540 as illustrated in FIG. 1.

Although the above embodiment produces a pixel every two clock cycles, other ratios are possible. For example, one embodiment may produce a pixel every four, six, or eight clock cycles. Certain arithmetic functional blocks may be designed to operate with additional clock cycles to process the pixel information.

Figure 4A:
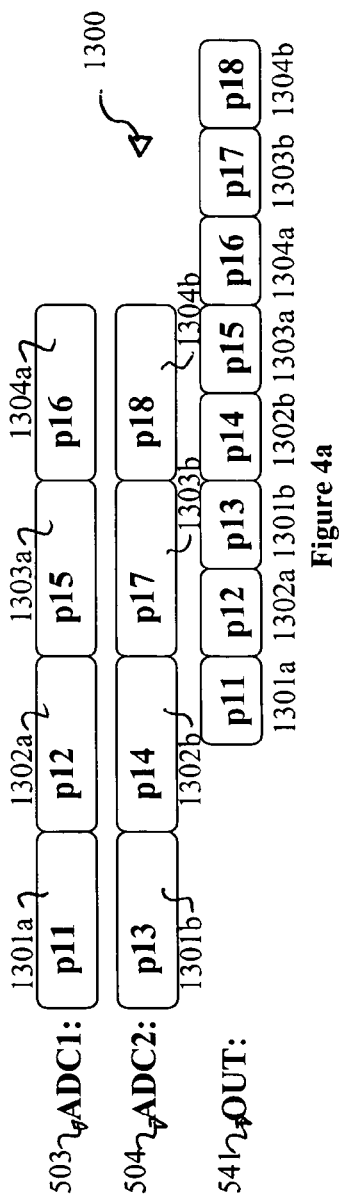
FIGS. 4a-c provide timing diagrams illustrating the processing of pixels in accordance with various embodiments of the present invention where pixels processed through analog processing pipes are converted to the digital domain.

FIG. 4*a* illustrates this process with a timing diagram 1300 where the analog to digital converters 503, 504 each output four pixels 1301, 1302, 1303, 1304 for a total of eight output pixels that are prepared during sixteen clock cycles. These eight pixels are then reordered to form the pixels in an output 541 from the pixel reordering function 540 that is representative of the detected image. Thus, for example, pixel 1301*a* represents row one, column one of pixel array 601 is followed by pixel 1302*a* that is row one, column two, and subsequently by pixel 1301*b* that is row one, column three. This process continues for each line until the pixels from all columns are placed in proper order. Of note, a pixel is produced for every two clock cycles in this embodiment.

When a full-resolution image of a smaller size is desired, the analog processing pipes 501, 502 and analog to digital controllers 503, 504 are set in operational mode B. Power saving is achieved in mode B, by putting analog processing pipes 501, 502 and analog to digital converters 503, 504 in a standby mode in the inactive portions of the image. When standby mode is implemented for analog circuits, it provides less power saving than inactive mode, but it allows fast switch to fully-operational active mode. In one embodiment of the present invention, standby mode is entered and hence power saving is achieved for the areas of the image which are, for left-to-right and top-to-bottom scanning, to the right or below the L-FOV. In those areas, Horizontal and Vertical Blank signals are generated, the array is not scanned and the dual stream ADC system 234 is put in standby mode. In another embodiment, power is saved also at the image areas above and to the left of the L-FOV—Output Disable control is asserted and dual stream ADC system 234 are put in standby mode until a few clock cycles before the L-FOV is to be scanned.

In the third mode (mode C), a full FOV image is desired, but the resolution is only half that of the image sensor 601, the array lines that are in the full FOV window are all exposed and read, but only one of analog to digital converters 503, 504 is activated. This achieves horizontal sub-sampling where two pixels are produced every eight clock cycles, as compared to four pixels for the same number of clock cycles when both analog to digital converters are enabled. This horizontal sub-sampling is illustrated as a timing diagram 1310 of FIG. 4*b* where pixels are processed by the first analog to digital converter 503, but not by the second analog to digital converter 504. The pixels from analog to digital converter 503 are inserted into the output stream 541 with a dead band 1309 representative of the pixels not processed by the second analog to digital converter 504.

Figure 4B:
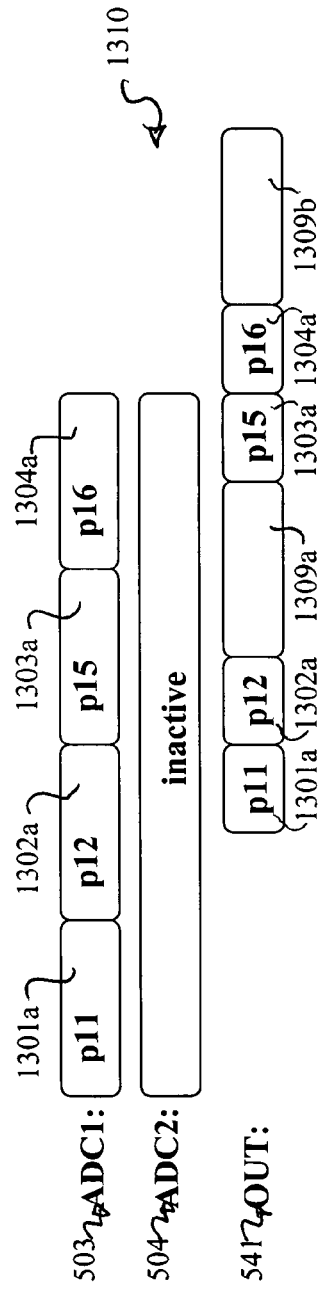
Figure 4C:
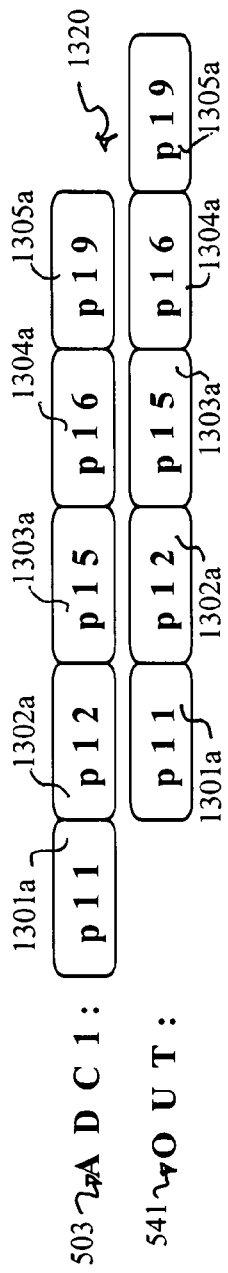

As can be appreciated from this discussion of timing diagram 1310 of FIG. 4*b*, output 541 is provided at twice the frequency necessary as one half of the clock cycles do not include pixel data. This can be very wasteful where the circuitry in the digital domain is forced to operate at twice the necessary clock frequency. Thus, in some embodiments, when Mode C is in use, pixels corresponding to the inactive analog to digital controller 504 are not included in the output, and dead bands 1309 from timing diagram 1310 are eliminated. This approach is illustrated in timing diagram 1320 of FIG. 4*c*, and can be used with a clock speed of one half that of the system described in relation to FIG. 4*b* and achieve the same frame rate.

To maintain the proper aspect ratio and to further save power, vertical sub-sampling can also be performed in some embodiments. In one embodiment, lines or rows of the sensor array 232 that are not needed due to sub-sampling are counted, during this vertical sub-sampling, but the associated analog to digital converter 503, 504 is shut down in a standby mode. Thus, no data is produced for these unneeded lines which are effectively dropped. In another embodiment those lines are not counted, and, effectively, every other line is skipped. Using representation 700 as an example, the first two pixels of each group of four pixels are processed, and the first two lines of each group of four lines are processed. Thus, pixels one and two of line one are processed, while pixels three and four of the same line are not. This alternating pixel sequence is repeated for lines one and two, but not for lines three and four. This combination of horizontal and vertical sub-sampling results in processing only one quarter of the total pixels in pixel array 601 while retaining a full color picture.

Some embodiments of the current invention can be set to work in a mode which is a combination of mode B and mode C, described above. That is—an L-FOV smaller than the active pixel array can be defined as in mode B, and then sub-sampling as defined for mode C could be done in the L-FOV.

In some embodiments, it is possible to set the clock frequency of imaging device 150 at less than its maximum specification. This is possible when the frame rate is not at its maximum rating. Clock frequency reduction is also possible with a limited FOV image, assuming the power saving of mode B is not utilized (or not fully utilized). Lastly, as explained above, clock frequency reduction is possible when the device is in mode C, and sub-sampling is applied.

Reduced clock frequency directly results in power saving for digital CMOS circuits. As well known in the art, power consumption is digital CMOS circuits is, to a large extent, proportional to the operating frequency. Hence, reducing the frequency by, for example, 50%, will save close to 50% of the power of the digital circuits.

The following table summarizes several of the modes that can be achieved in accordance with the approaches described above. Two image sensor types are depicted—SXGA, comprising 1280 active columns of 960 active pixels in each, and VGA image sensor type, comprising 640 active columns of 480 active pixels each. The output resolutions depicted in the table are 1280*960, 640*480, 320*240, 220*176 and 160*120 display resolutions. Also depicted in the table are the modes of operation as defined above for each of the examples, the size of the Field-of-View (FOV), what kind—if any—of sub-sampling is used, how many analog processing paths 505 are in use, what is the Frame-Per-Second (FPS) rate, what is the internal clock rate, how many clocks are needed to process a single pixel at the maximum rate and on the average. Based on the disclosure provided herein, one of ordinary skill in the art will recognize a number of other modes that can be implemented in various embodiments of imaging device 150.

| Array Type | Display Window | Mode | FOV | Digital Sub-sampling | Active analog paths | App. FPS | Clock (internal) | Peak clocks/ pixel | Average clocks/ pixel |
|---|---|---|---|---|---|---|---|---|---|
| SXGA 1280C 960L | 1280*960 (SXGA) | A | full | none | 2 | 15 | 80 MHz | 4 | 4.4 |
| | 640*480 (VGA) | C | full | 1:2 hor 1:2 ver | 1 | 28 | 80 MHz | 8 | 9.15 |
| | 320*240 (QVGA) | B + C | Limited | 1:2 hor 1:2 ver | 1 | 42 | 16 MHz | 4 | 5 |
| | 220*176 | B + C | Limited | 1:2 hor 1:2 ver | 1 | 27 | 20 MHz | 16 | 19 |
| VGA 640C 480L | 640*480 (VGA) | A | Full | none | 2 | 22 | 32 MHz | 4 | 4.6 |
| | 320*240 (QVGA) | B | Full | 1:2 hor 1:2 ver | 1 | 21 | 8 MHz | 4 | 5 |
| | 160*120 (QQVGA) | B + C | Limited | 1:2 hor 1:2 ver | 1 | 31 | 12 MHz | 8 | 20 |

In one particular embodiment of the present invention, an imaging device including a CMOS sensor is provided. The imaging device includes an imager array, sensor timing control, and image processing algorithms integrated onto a single chip. Such an imaging device can produce CIF (i.e., 352×288) resolution image for still capture, and QCIF (i.e., 176×144) resolution image for video applications. In addition, the imaging device can perform various correction algorithms on a captured image to create a corrected YCrCb (4:2:2) image. In another embodiment, at least the sensor array 232 and analog to digital converters 503, 504 are on a single CMOS chip.

In an embodiment, the imager array is 384×316 physical pixels including 376×296 active pixels. The pixels can be mapped to a configurable size of output Bayer grid array (e.g., windowing). Pixel size can be 6.4 µm×6.4 µm, 6.5 µm×6.5 µm or other sizes. QCIF resolution can be created by either or both of down-sampling and filtering.

In another embodiment of the present invention, an imaging device including a CMOS sensor is provided. The imaging device includes an imager array, sensor timing control, and image processing algorithms integrated onto a single chip. Such an imaging device can produce VGA (i.e., 640× 480) resolution image for still capture, and QVGA (i.e., 320× 240) resolution image for video applications. In addition, the imaging device can perform various correction algorithms on a captured image to create a corrected YCrCb (4:2:2) image.

In yet another embodiment, the imager array is 1324×1024 physical pixels including 1296×992 active pixels. The pixels can be mapped to a configurable size of output Bayer grid array (e.g., windowing). Pixel size can be 3.2 µm×3.2 µm, 3.5 µm×3.5 µm or other sizes. VGA and QVGA resolution can be created by either or all of down-sampling, limited FOV and filtering.

The imaging device can operate, in one embodiment, on a single 2.8 volt power supply, and a reduced-power mode can be implemented to reduce power consumption when full operation of the imaging device is not necessary. In addition, the imaging device can include an inactive mode for further reducing power consumption. In other embodiments the imaging device can operate on a single 1.8V power supply.

The invention has now been described in detail for purposes of clarity and understanding. However, it will be appreciated that certain changes and modifications may be practiced within the scope of the appended claims. Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. An imaging system for electronically capturing optical images comprising:
   a pixel array including,
      a first pixel group associated with a first portion of an optical image and a first signal, the first pixel group including color components of at least three different colors, and
      a second pixel group associated with a second portion of the optical image and a second signal, the second pixel group including color components of at least the three different colors;
   a digital conversion system including,
      a first digital conversion subsystem, including a first level shift function configured to receive the first signal, a first black offset function, a first gain function and a first analog to digital converter configured to convert the first signal to a first digital signal, and
      a second digital conversion subsystem, including a second level shift function configured to receive the second signal, a second black offset function, a second gain function and a second analog to digital converter configured to convert the second signal to a second digital signal, wherein
      each of the first and second digital conversion subsystems are configured to operate in a first or second power mode, the first power mode consuming more power than the second power mode.

2. The imaging system of claim 1, further comprising:
   at least a third digital conversion subsystem.

3. The imaging system of claim 1, wherein the first analog to digital converter is configured to operate in the first power mode, while the second analog to digital converter is configured to operate in the second power mode.

4. The imaging system of claim 1, further comprising:
   a programmable control network operable to place the first analog to digital converter in the first power mode, and place the second analog to digital converter in the second power mode.

5. The imaging system of claim 1, further comprising:
a digital processing system, configured to process at least one of the first digital signal and the second digital signal to generate a unified digital image.

6. The imaging system for of claim 1, wherein in the second power mode, the second analog to digital converter consumes no more than sixty percent of an amount of power consumed by the second analog to digital converter in the first power mode.

7. The imaging system of claim 1, wherein a digital image produced by the imaging system in the second mode is one quarter a maximum size.

8. The imaging system of claim 1, wherein a digital image produced by the imaging system in the second power mode is less than a maximum size.

9. The imaging system of claim 1, wherein a digital image produced by the imaging system is digitally sub-sampled in a horizontal or a vertical direction.

10. The imaging system of claim 1, further comprising:
a clock associated with one of the first and second analog to digital converters and having a speed to decrease a resolution of images produced by the imaging system in a predetermined mode.

11. The imaging system of claim 1, wherein the first analog to digital converter, the second analog to digital converter, and the pixel array are implemented on a single CMOS chip.

12. A method for acquiring an image with a CMOS imaging array comprising:
generating a first analog signal representative of a first subset of pixels from the CMOS imaging array, the first subset of pixels including color components of at least three different colors;
processing the first analog signal using a first level shift function configured to receive the first signal, a first black offset function and a first gain function;
converting the first analog signal into first digital data;
generating a second analog signal representative of a second subset of pixels from the CMOS imaging array, the second subset of pixels including color components of at least the three different colors; and
processing the second analog signal using a second level shift function configured to receive the second signal, a second black offset function and a second gain function;
selectively converting the second analog signal into second digital data when a first power mode is selected.

13. The method of claim 12, wherein the first digital data generates a full color portion of a processed image.

14. The method of claim 12, wherein geometric dimensions for the first subset of pixels are equal to geometric dimensions of the second subset of pixels.

15. The method of claim 12, further comprising:
generating a third analog signal representative of a third subset of pixels from the CMOS imaging array.

16. The method of claim 12, wherein the first subset of pixels includes a plurality of pixels in a horizontal axis and a vertical axis.

17. The method of claim 12, wherein a size of the first subset of pixels is reduced in a second power mode.

18. An imaging system for electronically capturing optical images, the imaging system comprising:
a pixel array including,
a first pixel configured to provide a first analog signal associated with a first portion of an image, and
a second pixel configured to provide a second analog signal associated with a second portion of the image;
a digital conversion system including,
a first digital conversion subsystem, including a first level shift function configured to receive the first signal, a first black offset function, a first gain function and a first analog to digital converter configured to convert the first analog signal to a first digital signal representative of color components of at least three different colors, the first digital signal being configured to generate a portion of a processed image including the three different colors;
a second digital conversion subsystem, including a second level shift function configured to receive the second signal, a second black offset function, a second gain function and a second analog to digital converter configured to convert the second analog signal to a second digital signal representative of color components of at least the three different colors; and
the second analog to digital converter being configured to be put into a reduced power mode when the first analog to digital converter is not in the reduced power mode.

19. The imaging system of claim 18, further comprising:
at least a third analog to digital converter configured to convert a plurality of pixels in the pixel array.

20. The imaging system for of claim 18, wherein an optical image is produced in the reduced power mode with a full field of view, but reduced resolution.

* * * * *